United States Patent [19]
Ito et al.

[11] Patent Number: 5,432,752
[45] Date of Patent: Jul. 11, 1995

[54] SYSTEM FOR ACOUSTICALLY MEASURING THE LENGTH OF A PIPE

[75] Inventors: Takanori Ito, Tokyo; Hideo Tai, Chiba, both of Japan

[73] Assignee: Tokyo Gas Co., Ltd., Tokyo, Japan

[21] Appl. No.: 188,707

[22] Filed: Jan. 31, 1994

[30]  Foreign Application Priority Data

Feb. 3, 1993 [JP] Japan ................................ 5-039532

[51] Int. Cl.⁶ ...................... G01S 11/14; G01N 29/22
[52] U.S. Cl. ........................................ 367/99; 367/902
[58] Field of Search ................ 367/87, 99, 107, 902; 73/597

[56]  References Cited

U.S. PATENT DOCUMENTS

| | | | |
|---|---|---|---|
| 4,234,942 | 11/1980 | Prause et al. | 367/128 |
| 4,494,224 | 1/1985 | Morrell et al. | 367/99 |
| 4,584,676 | 4/1986 | Newman | 367/902 |
| 4,930,350 | 6/1990 | Bode et al. | 73/597 |
| 4,935,884 | 6/1990 | Hajicek | 367/902 |
| 5,195,059 | 3/1993 | Hiroshi et al. | 367/99 |

FOREIGN PATENT DOCUMENTS 2313149  9/1974  Germany .

*Primary Examiner*—Ian J. Lobo
*Attorney, Agent, or Firm*—Niakido Marmelstein Murray & Oram

[57]  ABSTRACT

A calibration pipe having a predetermined length is connected to an end of a pipe to be measured. A sound emitter and a sound receiver are connected to a base end of the calibration pipe. The sound emitter emits a sound into the calibration pipe and the pipe to be measured, and the sound receiver receives a sound reflected from a discontinuous portion of the pipe. A calculator is provided for calculating a period of time from emitting of the sound to receiving of the reflected sound. The length of the pipe is calculated based on speed of the sound in the calibration pipe.

5 Claims, 4 Drawing Sheets

SYSTEM FOR ACOUSTICALLY MEASURING THE LENGTH OF A PIPE

BACKGROUND OF THE INVENTION

The present invention relates to a system for acoustically measuring the length of a pipe disposed under a road by using sound wave, and more particularly to a calibration system provided for calibrating change of speed of sound caused by pressure, temperature and component of gas in the pipe.

A pipe of a pipeline such as a gas main is disposed under a road for a long time so that the pipe may be corroded or broken by external force. In such a case, there is a method for lining an inner surface of a distributing pipe branched from the pipe-line with coating material such as resin. In order to repair the distributing pipe, there has been developed a method in which the inner surface of the pipe is repaired without digging the pipe.

In such a method, if the amount of resin exceeds a desired value, the resin is unnecessarily used. If the amount of resin is less than the desired value, the pipe is insufficiently lined. Accordingly, it is necessary to accurately measure the length of the distributing pipe to be repaired.

FIG. 3 shows a conventional measuring system for acoustically measuring the length of the distributing pipe. The measuring system is adapted to measure a distributing pipe 28 having a bent portion branched into a residential lot of a customer, from a gas main 29 which is laid under a street. One end of the distributing pipe 28 is connected to the gas main 29 by way of a joint. The other end of the pipe 28 is connected with a service riser, to an end of which a gas meter 15 is normally connected.

The measuring system comprises a pipe length measuring unit 21 and a cylindrical connecting member 16 for connecting the unit 21 to the pipe 28 through a lead 16b. The connecting member 16 is mounted on the end of the distributing pipe 28 by removing the gas meter 15 therefrom.

As shown in FIG. 4, the connecting member 16 has an inner threaded portion 16a formed at an end thereof to be engaged with an outer threaded portion formed on the end of the distributing pipe 28. On the other end of the connecting member 16, a sound emitter 25 and a sound receiver 26 are provided to be exposed to the pipe. A temperature sensor (thermistor) 27 is provided in the connecting member 16 adjacent to the sound emitter and sound receiver for measuring the temperature in the pipe.

The pipe length measuring unit 21 comprises a CPU 22, an amplifier 17 connected to the sound emitter 25, an amplifier 18 connected to the sound receiver 26, a D/A converter 19 connected to the amplifier 17 and to the CPU 22, an A/D converter 20 connected to the amplifier 18 and to the CPU, a memory 24 selectively connected to the CPU through a switch S, and a display 23 connected to the CPU. The temperature sensor 27 is connected to the memory 24.

In an measuring operation, the CPU 22 produces a command signal in the form of pulses for emitting a sound wave. The signal is applied to the D/A converter 19 to be converted into an analog signal. The analog signal is amplified by the amplifier 17. The sound emitter 25 is operated to emit a sound wave into the pipe 28. The sound wave is reflected at discontinuous positions such as joint, bent portion and opening portion. The reflected sound is received by the sound receiver 26 and amplified by the amplifier 18. The amplified signal is converted into a digital signal at the A/D converter 20 and applied to the CPU 22. The CPU measures a period of time from emitting of the sound in the pipe 28 to receiving the reflected sound in accordance with a time measuring circuit provided therein and calculates the length of the pipe 28 based on the measured period of time and the speed of the sound. The length of the pipe is displayed on the display 23.

The memory 24 stores data of the speed of the sound corresponding to the type of gases (such as air or natural gas) and the temperature detected by the sensor 27. The operator operates to change the switch S in dependency on the type of gas and the detected temperature so as to set a standard value of the speed of the sound.

However, the speed of sound largely changes in dependency on the temperature and component of gas in the pipe.

Therefore, for the pipeline of town gas, speeds of sound are previously measured at every one or a few grades of the temperature between 0 and 30 degrees under a constant pressure for every kind of gas. The data of the relationship between the speed of sound and the temperature and component of gas are stored in the memory 24. The switch S is operated for selecting data in accordance with conditions. Alternatively, an equation of the relationship is provided for correcting the measured value based on the temperature.

Accordingly, the handling of the system is complicated because of the measurement of temperature, the handling of the switch and others. Moreover, the length of the pipe can not be measured with accuracy because of measurement error.

SUMMARY OF THE INVENTION

An object of the present invention is to provide a system for acoustically measuring the length of a pipe which may eliminate measuring errors caused by temperature and component of the gas in the pipe, thereby obtaining the length of the pipe with accuracy.

According to the present invention, there is provided a system for acoustically measuring a length of a pipe, the system having a sound emitter to be connected to an end of the pipe so as to emit a sound into the pipe, a sound receiver for receiving a sound reflected from a discontinuous portion of the pipe, calculator means for calculating a period of time from emitting of the sound to receiving of the reflected sound.

The system comprises a calibration pipe which has a predetermined length and is to be connected to the end of the pipe at a front end thereof, the sound emitter and sound receiver being connected to a base end of the calibration pipe, the calculator means being arranged to calculate the length of the pipe based on a period of time from the emitting of the sound into the calibration pipe connected to the pipe to the receiving of the sound reflected at the front end of the calibration pipe.

The speed of the sound in the calibration pipe and the length of the pipe are calculated as follows.

Speed of sound=(length of the calibration pipe×2) ÷(reciprocating period of time from emitting sound to receiving sound in the calibration pipe).

Length of pipe=(length of the calibration pipe×2) ÷(reciprocating period of time from emitting sound to receiving sound in the calibration pipe)×(reciprocating period of time from emitting sound to receiving sound in the distributing pipe)÷2−(the length of the calibration pipe).

These and other objects and features of the present invention will become more apparent from the following detailed description with reference to the accompanying drawings.

DETAILED DESCRIPTION OF THE PREFERRED EMBODIMENT

Figure 1:
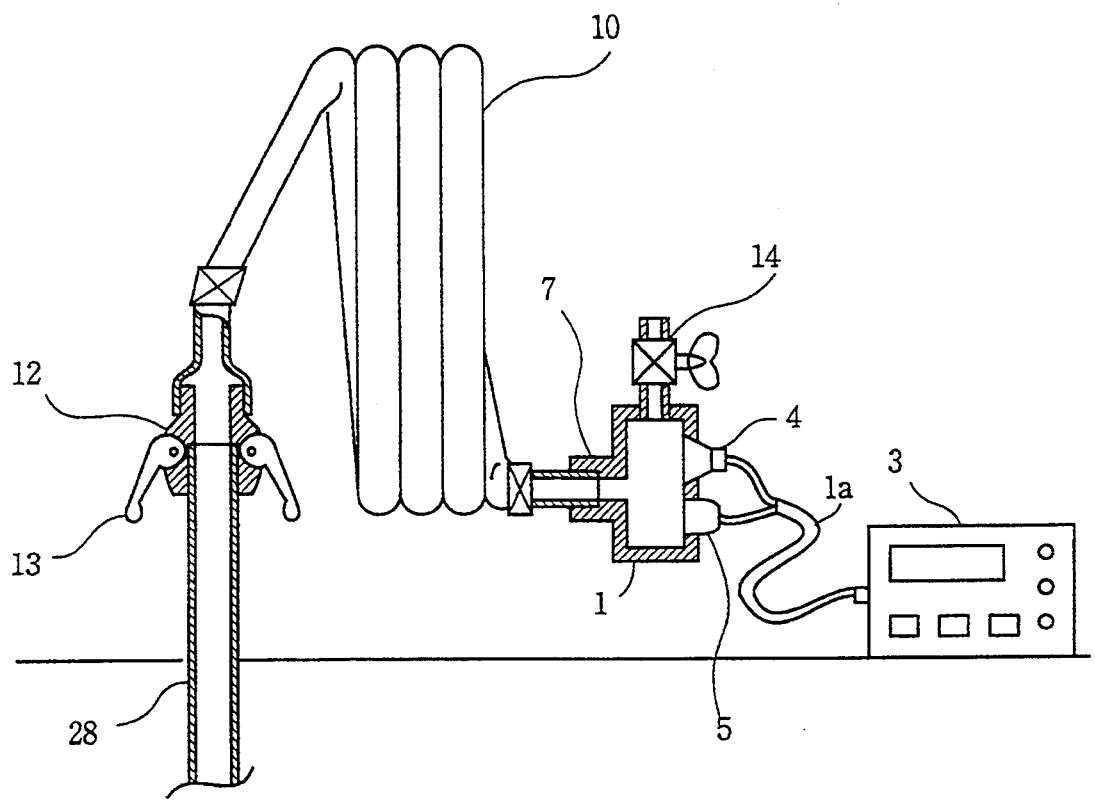
FIG. 1 is a schematic view showing a measuring system according to the present invention.

Referring to FIG. 1, a measuring system of the present invention has a calibration pipe 10 provided between a connecting member of a measuring unit and the distributing pipe 28. The system comprises a pipe length measuring unit 3 and a connecting member 1 connected to the unit 3 through a lead 1a.

The connecting member 1 has a sound emitter 4 and a sound receiver 5 both of which are the same as the conventional one, a discharge valve 14, and a connecting portion 7 to which a base end of the calibration pipe 10 is connected.

The calibration pipe 10 has a spiral form and a predetermined length, for example a length between 3 m and 10 m.

A connecting device 12 having operating handles 13 is provided for detachably connecting the front end of the calibration pipe 10 to the distributing pipe 28. Another connecting device may also be provided on the connecting portion 7.

Figure 2:
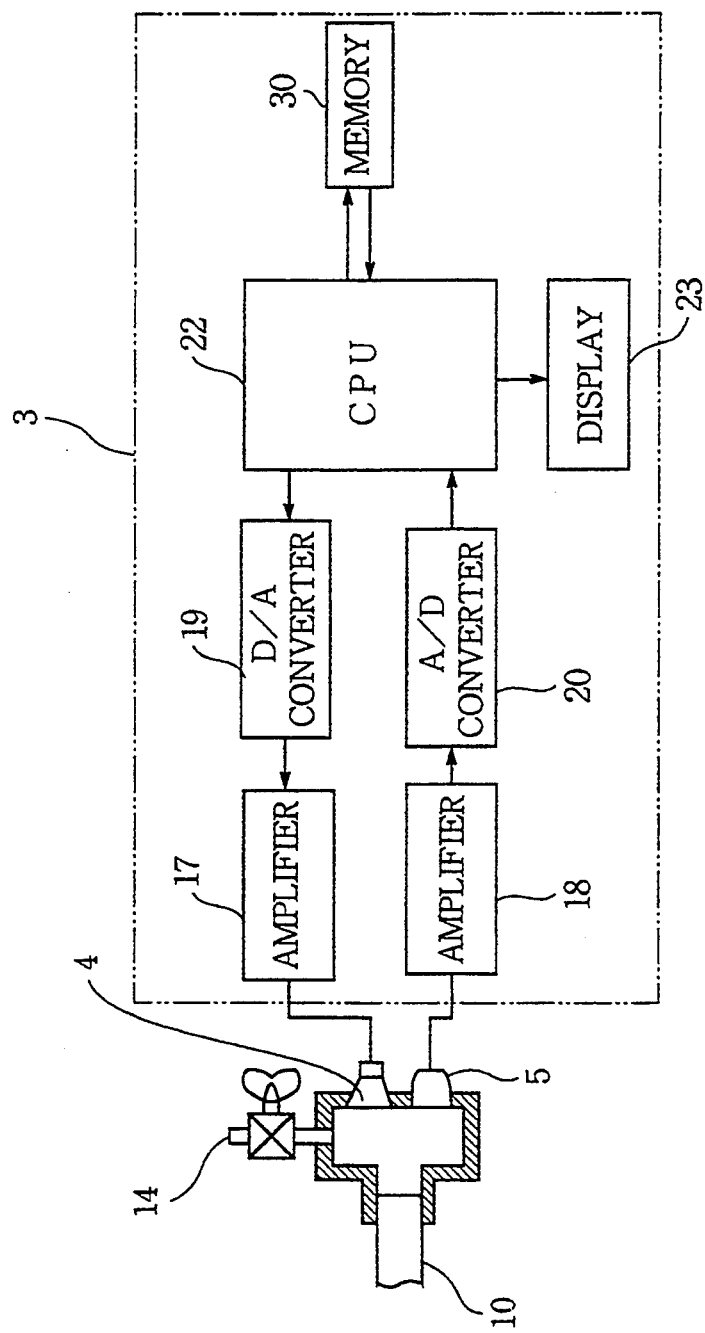
FIG. 2 is a block diagram showing the system of the present invention.
Figure 3:
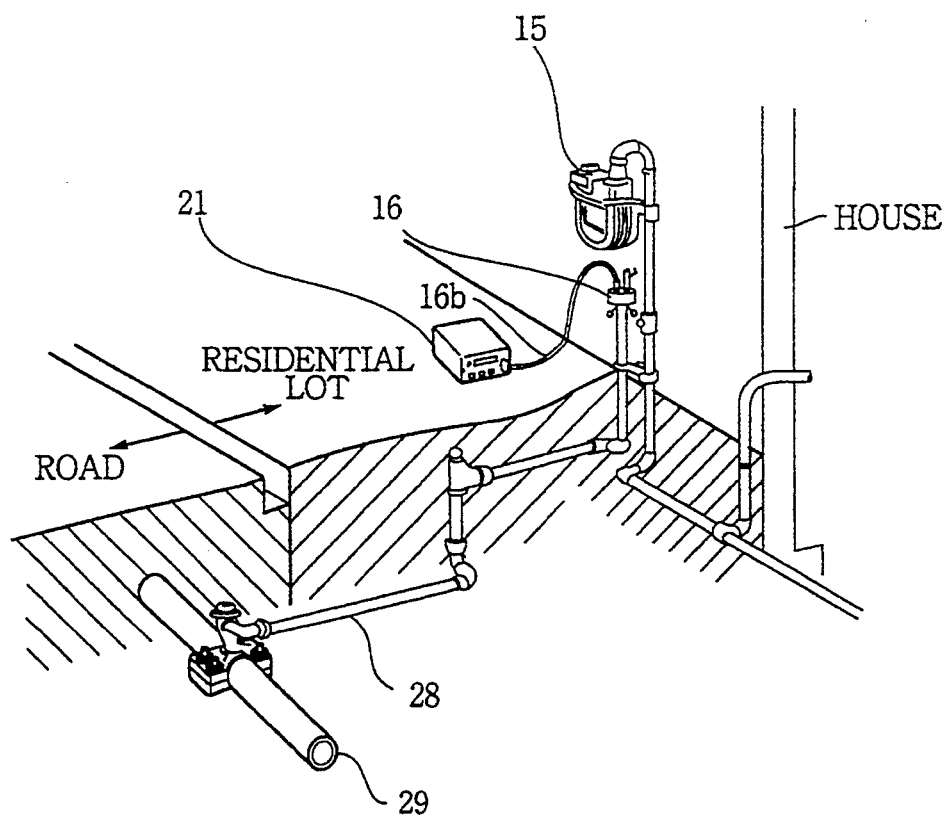
FIG. 3 is a schematic view showing a conventional measuring system.
Figure 4:
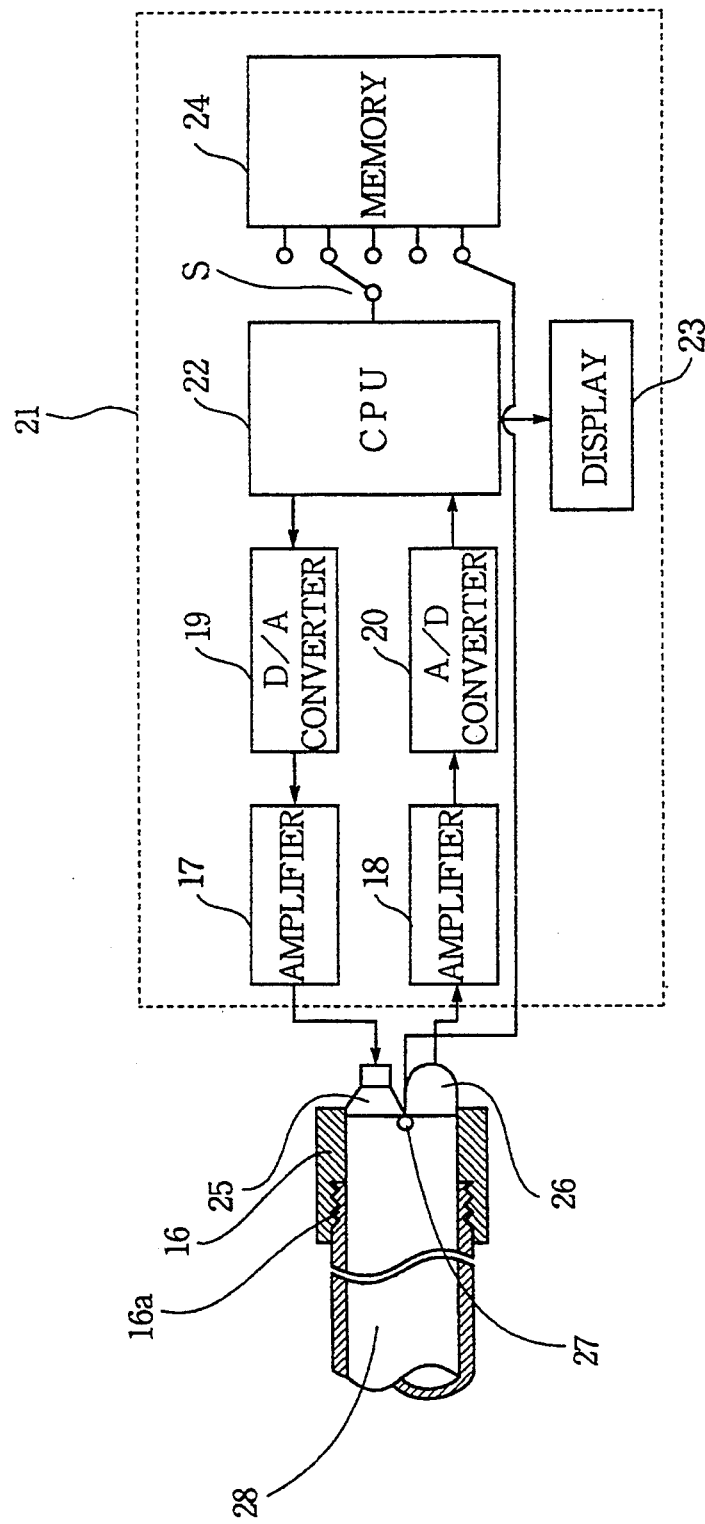
FIG. 4 is a block diagram showing the conventional system.

Referring to FIG. 2, the pipe length measuring unit 3 has approximately the same structure as the conventional one. The pipe length measuring unit 3 comprises CPU 22, amplifier 17 connected to the sound emitter 4, amplifier 18 connected to the sound receiver 5, D/A converter 19 connected to the amplifier 17 and to the CPU 22, and A/D converter 20 connected to the amplifier 18 and to the CPU. A memory 30 connected to the CPU 22 stores data necessary for calculating a period of time from emitting the sound to receiving the first reflected sound as a standard value for calculating the length of the pipe 28 at the CPU 22.

In measuring operation, the discharge valve 14 of the connecting member 1 is opened so as to discharge air in the calibration pipe 10 with aid of pressure of gas in the distributing pipe 28 to the atmosphere, while introducing the gas in the distributing pipe 28 in the calibration pipe 10. When the calibration pipe 10 is filled with the gas, the discharge valve 14 is closed. Since the pipe 10 is filled with the same gas as in the pipe 28, the speed of sound in the pipe 10 is equal to that in the pipe 28.

The CPU 22 produces a command signal in the form of pulses for emitting a sound wave. The signal is applied to the D/A converter 19 to be converted into an analog signal. The analog signal is amplified by the amplifier 17. The sound emitter 4 is operated to emit a sound wave into the pipe 28. The sound wave is reflected at a discontinuous position of the pipe such as joint, bent portion and opening portion in the pipe 28.

The emitted sound is first reflected at the front end of the calibration pipe 10. Thus, the entire length of the pipe 10 is in proportion to the period of time from the emitting of the sound to receiving the first reflected sound.

If a small projection is provided in the front end, the reflection of sound is ensured.

The speed of sound in the calibration pipe 10, and hence distribution pipe 28 is calculated as follows.

Speed of sound=(length of the calibration pipe×2) ÷(reciprocating period of time from emitting sound to receiving sound in the calibration pipe).

It is not necessary to correct the speed of sound, since the speed is the same as the speed in the pipe 28. Thus, an accurate length of the pipe can be obtained based on the calculated speed of the sound.

The length of the pipe 28 is calculated as follows.

Length of pipe=(length of the calibration pipe×2) ÷(reciprocating period of time from emitting sound to receiving sound in the calibration pipe)×(reciprocating period of time from emitting sound to receiving sound in the distributing pipe)÷2−(the length of the calibration pipe).

Thus, the length of the pipe is measured irrespective of the temperature, pressure and component of gas.

A ratio of the reciprocating time of sound in the calibration pipe 10 to the reciprocating time of the reflected sound in the pipe 28 is equal to a ratio of the length of the calibration pipe 10 to a distance from the base end of the pipe 10 to a position where a sound is reflected in the pipe 28. Thus, the sound reflected position in the pipe 28 can be easily calculated.

In accordance with the present invention, the calibration pipe having a simple structure is provided for eliminating measured errors caused by temperature, pressure and component of gas. Consequently, the length of the pipe is measured with accuracy.

Since the memory for correcting the speed of sound is omitted, the structure of the unit is simplified.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for acoustically measuring a length of a pipe, the system having a sound emitter to be connected to an end of the pipe so as to emit a sound into the pipe, a sound receiver for receiving a sound reflected from a discontinuous portion of the pipe, calculator means for calculating a period of time from emitting of the sound to receiving of the reflected sound, the system comprising:

a calibration pipe which has a predetermined length and is to be connected to said end of the pipe at a front end thereof;

said sound emitter and sound receiver being connected to a base end of the calibration pipe;

said calculator means being arranged to calculate the length of the pipe based on a period of time from the emitting of the sound into the calibration pipe connected to the pipe to the receiving of the sound reflected at the front end of the calibration pipe.

2. The system according to claim 1 further comprising a discharge valve connected to the calibration pipe at a base end thereof so as to discharge air in the calibration pipe with aid of pressure of gas in the pipe.

3. The system according to claim 1 wherein the calibration pipe has a spiral form.

4. A method for acoustically measuring the length of a pipe, comprising:

connecting a calibration pipe which has a predetermined length to an end of the pipe at a front end thereof;

emitting a sound in the calibration pipe at a base end thereof;

receiving a sound reflected at the front end of the calibration pipe;

calculating the length of the pipe based on the predetermined length and a period of time from emitting of the sound in the calibration pipe to receiving of the sound reflected at the front end of the calibration pipe and on a reciprocating time of sound reflected in the pipe.

5. The method according to claim 4 wherein the calculation of the length of the pipe is performed by a following equation, length of pipe=(length of the calibration pipe×2)÷(reciprocating period of time from emitting sound to receiving sound in the calibration pipe)×(reciprocating period of time from emitting sound to receiving sound in the distributing pipe)÷2−(-the length of the calibration pipe).

* * * * *